Dec. 18, 1923.

J. A. LEWIS ET AL 1,478,126

MEANS FOR REMOVING ARTICLES FROM MOLDS

Filed March 9, 1922

J. A. Lewis and A. C. Crimmel, Inventors

By _____ Attorneys

Patented Dec. 18, 1923.

1,478,126

UNITED STATES PATENT OFFICE.

JAMES ALFRED LEWIS AND ALVIE C. CRIMMEL, OF HARTFORD CITY, INDIANA.

MEANS FOR REMOVING ARTICLES FROM MOLDS.

Application filed March 9, 1922. Serial No. 542,384.

*To all whom it may concern:*

Be it known that we, JAMES ALFRED LEWIS and ALVIE C. CRIMMEL, citizens of the United States, residing at Hartford City, in the county of Blackford, State of Indiana, have invented a new and useful Means for Removing Articles from Molds, of which the following is a specification.

This invention relates to a means for removing articles from molds.

When molding articles, especially flat ones such as headlight lenses and the like, it has been found that if they are permitted to cool within the molds the ends or edges of the articles will first cool and this action causes the articles to buckle. Thus it is practically impossible to produce a perfectly flat article under these conditions.

Furthermore where articles are permitted to cool in the molds considerable difficulty is experienced in removing them uninjured. In fact this difficulty is present at all times because it has been necessary to invert the molds and tap them until the molded articles have been dislodged therefrom.

One of the objects of this invention is to eliminate the objections heretofore present by providing a means whereby a molded article can be lifted out of the mold and can, at the same time, be cooled, it being possible to lift the article before it is perfectly cool and before it has had a chance to buckle within the mold.

Another object is to provide apparatus which can be used for lifting an article out of a mold and for depositing the article outside of the mold without the necessity of turning the article over and bringing the hot upper face thereof in contact with a supporting structure which might scar or distort said surface.

A further object is to provide apparatus of this character which is simple, durable and efficient and which can be operated readily.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
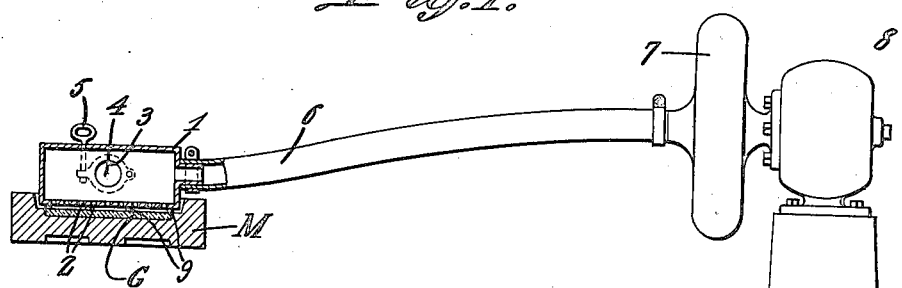
Figure 1 is a view partly in elevation and partly in section of the apparatus showing the same in position to remove an article from a mold.
Figure 2:
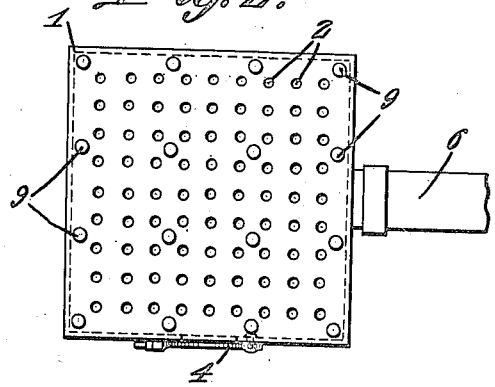
Figure 2 is an enlarged bottom plan view of the suction head.

Referring to the figures by characters of reference 1 designates a suction head so proportioned that it can be inserted into a mold so as to contact with the object formed within the mold. This suction head has one face formed with apertures 2 and any suitable means may be provided for holding the apertured surface of the suction head out of contact with but close to the surface of the object to be removed from the mold. The suction head can be of any construction desired and is preferably formed with a relief opening 3 normally closed by a suitable valve 4 which can be operated by means of a handle 5 or in any other manner desired.

A flexible tube 6 is preferably connected to the suction head so as to communicate with the interior thereof and this tube may be attached to the intake of a blower fan casing 7. An electric motor 8 or the like may be employed for operating the fan so that when said fan is actuated a suction will be set up to the casing 7 from the tube 6 and the head 1.

In Figure 1 a portion of a mold has been indicated at M and the article of glass formed therein has been shown at G. After this glass article has been pressed in the mold the said article can be removed without inverting the mold and before the article is cool. This is done by placing the suction head 1 in the mold and above the article. The apertured face of the suction head is spaced from the article G by lugs or projections as shown at 9 or in any other manner desired. A suction is set up through the head and this will cause air to rush between the suction head and the article G, thus causing said article to cling to the head and at the same time carry off heat from the molded article. The head can thus be used for lifting the article out of the mold after which said article can be set down on a suitable support with its bottom or chilled face lowermost so that the upper or top face will not be marred in the handling.

When it is desired to release the molded article from the head 1 the suction can be broken in any manner desired. For example the valve 4 can be opened so that air will enter the head through the opening 3 and thus relieve the article G from the suction.

Figure 3:
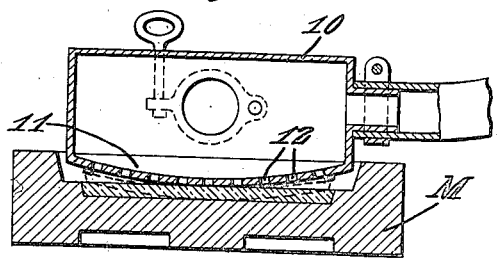
Figure 3 is a section through a modified form of suction head in position on an article within a mold.

In Figure 3 a slightly modified form of suction head has been shown, this head being utilized for the purpose of both supporting the molded article and bending it to the shape of the head. In this device the suction head 10 has a concavo-convex surface 11 in which are formed apertures 12. After the glass has been pressed within the mold M the suction head can be applied to the exposed surface of the glass and when the suction is set up this glass which is still soft, will be bent upwardly against the suction head as shown by dotted lines in Figure 3. The article can then be removed from the mold and deposited as heretofore explained.

Obviously various changes can be made in the construction and arrangement of the parts. Importance is attached to the fact that the apparatus not only serves as a means for lifting the article from the mold but also as a means for cooling the article and, when desired, a means for shaping the article to the surface of the head contacting therewith.

What is claimed is:—

1. A means for removing articles from the molds in which they are formed, said means including a suction head having air inlets in one face adapted to be placed in close proximity to the article to be removed from the mold, and means for creating an air current between the adjoining faces of the head and molded article to cool said article, and for producing a suction through said apertures and head to cause the molded article to adhere to the head.

2. A means for removing articles from a mold in which they are formed, comprising a suction head having an apertured face, means for spacing the apertured portions of said face away from the article to be removed from the mold, and means for setting up a suction between said article and the suction head and through said suction head to cause the article to adhere to the suction head and to cool the article.

3. A means for removing an article from a mold in which it is formed, comprising a suction head having an apertured face for engagement with said article, there being means for allowing the free flow of air over the engaged article and through the apertures in the suction head thereby to simultaneously cause the article to adhere to the head and cool the article, and means for setting up a suction through the suction head.

4. A means for removing molded articles from molds, comprising a suction head having an apertured face, spacing means on said face for engagement with the article to be removed from the mold, and means for setting up a suction through the suction head to cause the engaged article to adhere to the suction head and to set up a current of air between said article and the suction head to cool the article.

5. A means for removing molded articles from molds, comprising a suction head having an apertured face, spacing means on said face for engagement with the article to be removed from the mold, and means for setting up a suction through the suction head to cause the engaged article to adhere to the suction head and to set up a current of air between said article and the suction head to cool the article, and means for interrupting the suction to release the article from the head.

6. A means for lifting, shaping and cooling molded articles, comprising a suction head having an apertured face, means for setting up a suction through said face and head to cause an article to adhere to and shape itself upon the head, said suction setting up a circulation of air between the article and the head to cool the article.

In testimony that we claim the foregoing as our own, we have hereto affixed our signatures in the presence of two witnesses.

JAMES ALFRED LEWIS.
ALVIE C. CRIMMEL.

Witnesses:
HENRY HAYS CRIMMEL,
E. FLOYD WILLMAN.